Figure 1:
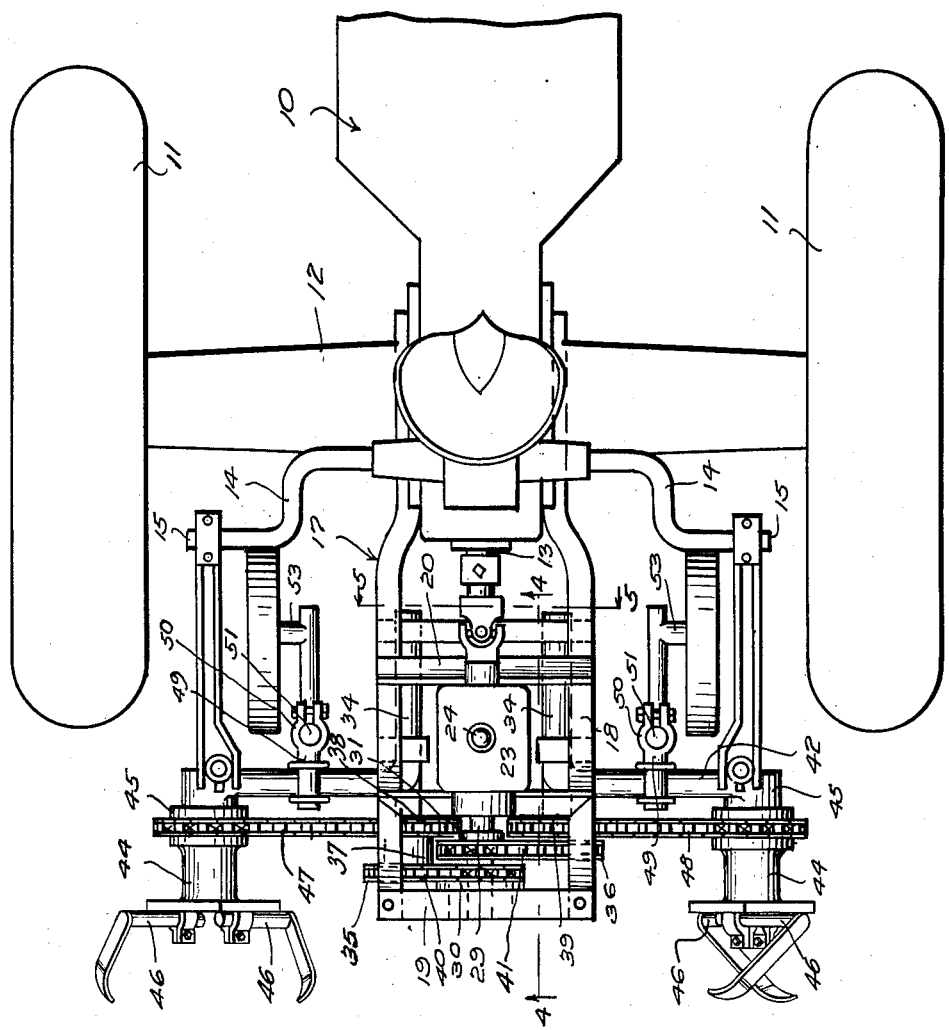

July 25, 1950 R. NEEL 2,516,794
TRACTOR MOUNTED COTTON CHOPPER
Filed Dec. 10, 1945 4 Sheets-Sheet 1

Inventor
Roy Neel,
By Clarence A. O'Brien
and Harvey B. Jacobson
Attorneys

July 25, 1950 R. NEEL 2,516,794
TRACTOR MOUNTED COTTON CHOPPER
Filed Dec. 10, 1945 4 Sheets-Sheet 4

Inventor
Roy Neel,

By *Clarence A. O'Brien and Harvey B. Jacobson*
Attorneys

Patented July 25, 1950

2,516,794

UNITED STATES PATENT OFFICE 2,516,794

TRACTOR MOUNTED COTTON CHOPPER

Roy Neel, Colorado City, Tex.

Application December 10, 1945, Serial No. 634,016

3 Claims. (Cl. 97—15)

This invention relates to an attachment for a farm tractor to render it useful as a cotton chopper.

The primary object of the invention is to facilitate the chopping of cotton by the use of an ordinary farm tractor by the simple expedient of connecting certain parts of the chopper attachment to the frame of the tractor and certain other parts of the chopper to the power take-off and the power lift ordinarily constituting the conventional equipment carried by modern farm tractors.

Another object of the invention is to gauge the depth to which the chopper blades operate and to compensate for rough and uneven terrain over which the device is being operated so as to insure uniform chopping.

The above and other objects may be attained by employing this invention which embodies among its features at least one rotary chopper movable in an arc which lies perpendicular to the direction of travel of the tractor to which the device is attached, a drive sprocket for the rotary chopper movable in unison therewith, means to establish driving connection between the sprocket and the power take-off of the tractor, gauge wheels for limiting the downward movement of the rotary chopper and means yieldingly to urge the chopper downwardly and the gauge wheels in contact with the terrain over which the device is being driven.

Other features include means connected with the chopper and the power lift of the tractor for elevating the chopper out of ground contacting position when the device is being transported from place to place.

Figure 2:
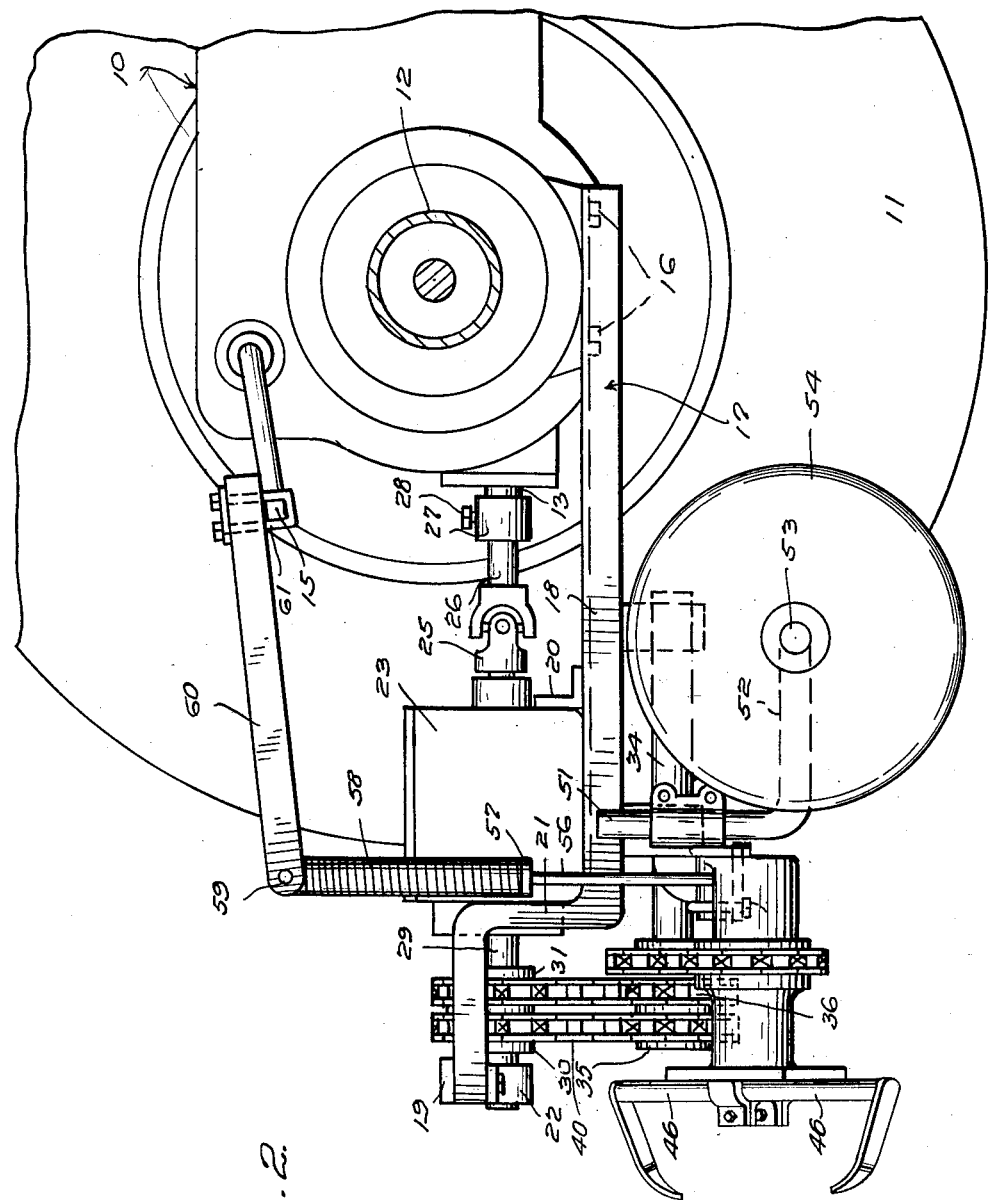
Figure 3:
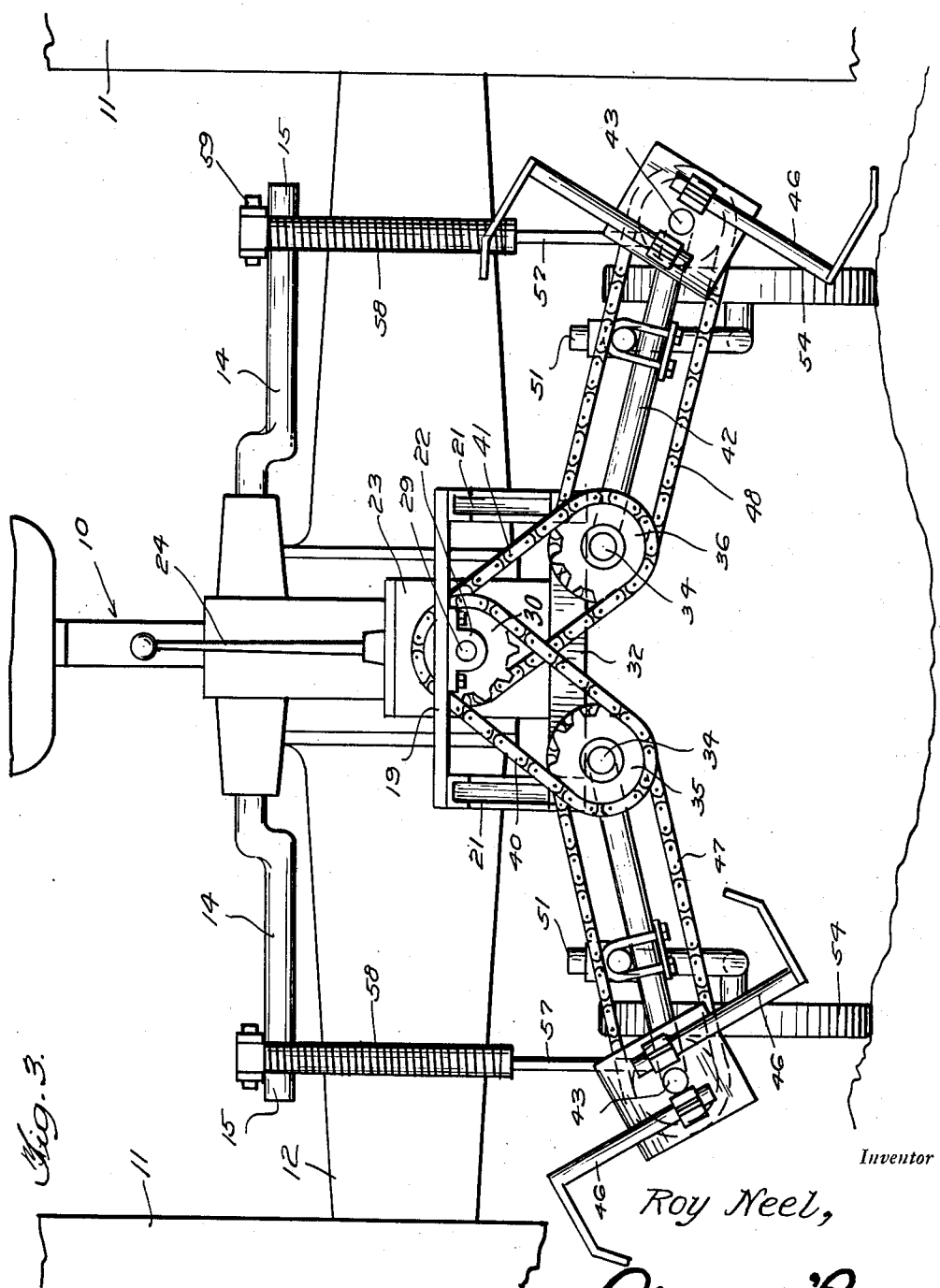
Figure 4:
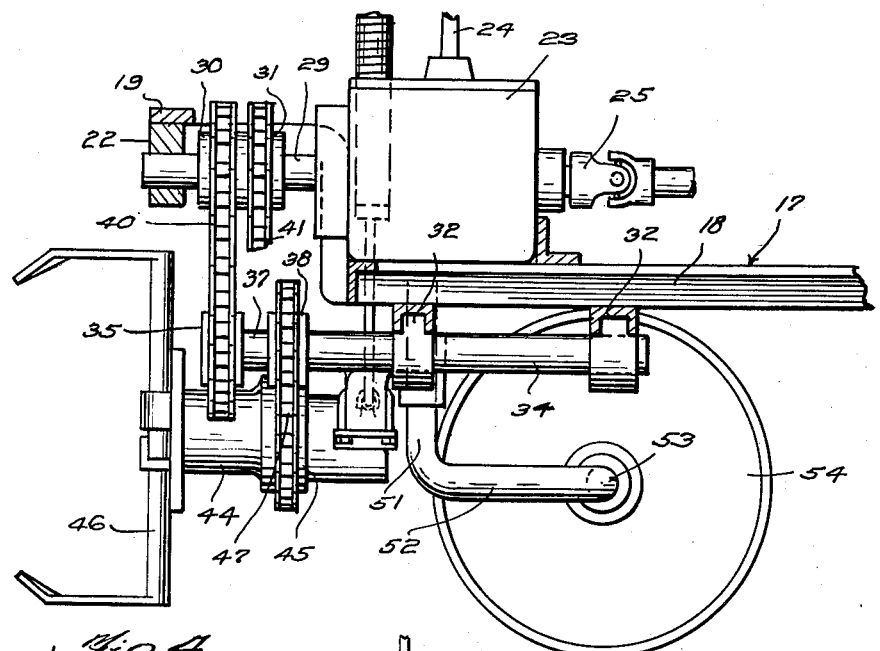
Figure 5:
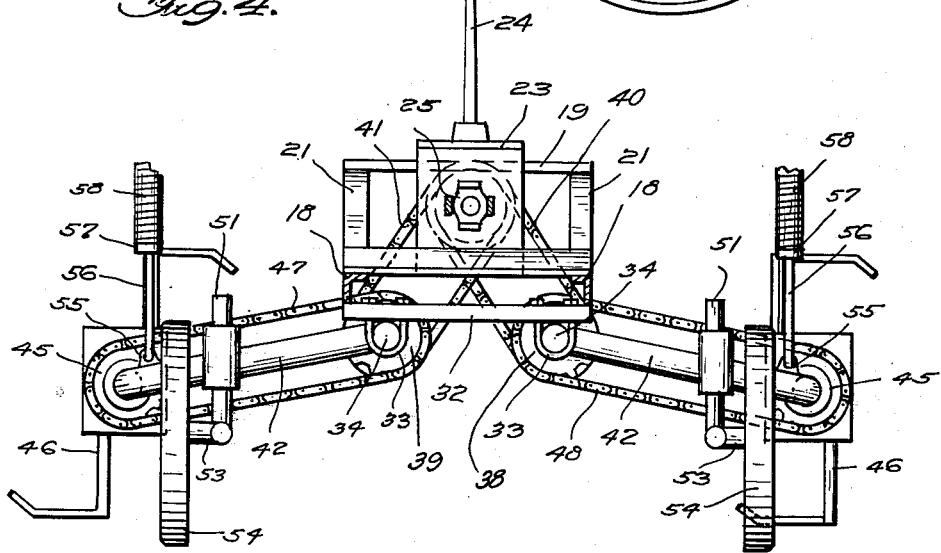

In the drawings:

Figure 1 is a top plan view of the rear end of a tractor showing this improved cotton chopping attachment applied thereto, Figure 2 is a side view of Figure 1 on an enlarged scale, Figure 3 is a rear end view of Figure 2, Figure 4 is an enlarged fragmentary longitudinal sectional view taken substantially on the line 4—4 of Figure 1, and Figure 5 is a transverse sectional view taken substantially on the line 5—5 of Figure 1.

Referring to the drawings in detail, a tractor designated generally 10 is provided with the usual drive wheels 11, rear axle 12, power take-off shaft 13 and a power lift comprising oppositely extending crank arms 14 which project transversely of the machine as illustrated in Figure 1 and are provided at their outer ends with the usual cranks having square ends 15.

Bolted as at 16 to the under side of the axle 12 is a frame designated generally 17 comprising a pair of side bars 18 which lie in spaced parallel relation and are joined at their rear ends by a cross bar 19 and intermediate their ends by a transversely extending bar 20. It will thus be seen that the frame 17 is of substantially rectangular configuration with forwardly extending side bars which lie beneath the axle 12 of the tractor to form the main supporting frame of the device. As illustrated in Figure 2 the side bars 18 are upwardly offset intermediate the bars 19 and 20 as at 21 and secured to the underside of the cross bar 19 is a suitable bearing block 22 which aligns axially with the power take-off shaft 13.

Mounted on the frame 17 in advance of the offset portion 21 is a gear case 23 housing a conventional set of variable speed transmission gears which are controlled in a conventional manner by a suitable gear shift lever 24. A drive shaft for the transmission gears extends forwardly from the gear case 23 in axial alignment with the power take-off shaft 13 and carries at its forward end a universal joint 25 to which a stub shaft 26 is connected. This stub shaft carries at its forward end a socket 27 which is internally splined to fit the external splines conventionally carried on the power take-off shaft 13 and this socket is clamped in place on the shaft 13 through the medium of a suitable set screw 28.

Extending through the rear end of the gear case 23 is a driven shaft 29 the rear end of which is journaled in the bearing block 22 previously referred to. Secured to the shaft 29 between the rear end of the gear case 23 and the bearing block 22 is a pair of sprockets 30 and 31 the purpose of which will be more fully hereinafter explained.

Secured to the underside of the frame 17 in spaced parallel relation are transversely extending inverted channels 32 each of which is provided adjacent opposite ends with longitudinally spaced openings for the reception of the legs of U-shaped hangers 33. Pivotally supported in the U-shaped hangers 33 are shafts 34 upon which drive sprockets 35 and 36 are mounted for rotation. Sprocket 35 is connected through a suitable sleeve 37 with a sprocket 38 which is adapted to rotate in unison with the sprocket 35 about the shaft 34 on one side of the machine and mounted for rotation adjacent and in unison with the sprocket 38 is a sprocket 39. A drive chain 40 establishes driving connection between the sprocket 38 and the sprocket 35 and a similar drive chain 41 establishes driving connection between the sprocket 31 and the sprocket 36. Inasmuch as both sprockets 30 and 31 are driven by the shaft 29 it will be apparent that the sprockets 38 and 39 will likewise be driven. Extending laterally from each shaft 34 intermediate its ends is an arm 42 carrying at its free end a stub shaft 43 upon which a drive sleeve 44 is mounted for rotation. This drive sleeve is provided near one end with a drive sprocket 45 while the opposite end of the sleeve has connected thereto a rotary chopper 46. Drive chain 47 establishes driving connection between the sprocket 39 and the sprocket 45 on one side of the machine while a drive chain 48 establishes driving connection between the sprocket 38 and the sprocket 45 on the opposite side of the machine. It will thus be seen that when the shaft 29 is set into motion the choppers 46 will be driven in unison.

Clamped by suitable U-bolts to each arm 42 is a forwardly extending clamp bracket 49 carrying at its forward end a clamp socket 50 in which a standard 51 is adjustably supported. This standard 51 is provided at its lower end with a forwardly extending arm 52 which is provided adjacent its forward end with a laterally extending spindle 53 upon which a gauge wheel 54 is rotatably mounted. It will thus be seen that by adjusting the standard 51 vertically in its respective bracket 50 the distance between the axis of each chopper 46 and the ground over which the device is operating may be regulated.

Pivotally connected to suitable ears 55 projecting upwardly from the arms 42 adjacent their free ends are plunger rods 56 carrying intermediate their ends stop collars 57 against which the lower ends of compression coil springs 58 bear. The ends of the rods 56 opposite those which are pivoted to the ears 55 are pivotally connected at 59 to lever arms 60 which extend forwardly in spaced parallel relation on opposite sides of the longitudinal axis of the device and are connected adjacent their forward ends by suitable U-bolts 61 to the crank arms 15 of the power lift of the tractor. As illustrated the upper ends of the coil springs 58 bear against the undersides of the levers 60 so as to urge the push rods 56 downwardly and hold the arms 42 and attendant mechanism in close proximity to the surface being traversed under yielding pressure. As illustrated in Figure 2 the crank arms 15 are of rectangular configuration so as to present a flat surface against which the lever arms 60 bear so that when the power lift is operated the arm 60 will move in unison to elevate the wheels 54 and rotary choppers 46 out of ground contacting position.

In operation it will be understood that as the power take-off shaft 13 is rotated the power will be transmitted through the universal joint 25 to the gears in the transmission case 23. The speed of rotation of the driven shaft 29 will be governed by setting the lever 24 to mesh the proper gears within the housing 23 and the sprockets 30 and 31 will be set in motion at the proper speed to drive the choppers 46 in unison on opposite sides of the machine and about axes parallel with the direction of travel of the tractor 10. Due to the pressure of the springs 58 on the outer ends of the arms 42 upon which the rotary choppers 46 are mounted it will be seen that the choppers will be held downwardly under yielding pressure to the proper cutting position above the surface being traversed which is governed by the position of the gauge wheels 54. When rough terrain is encountered the gauge wheels will serve to preserve the choppers 46 in proper relation to the surface despite the fact that the arms 42 may swing orbicularly about the axes of the shafts 34. Due to the fact that the axes of the sprockets 35 and 36 and their respective sprockets 38 and 39 are coincidental with the axes about which the arms 42 swing it will be obvious that no loss of driving power to the choppers 46 will be experienced irrespective of the position of the arms 42 about the axes of the shafts 34. When it is desired to transport the device without having the gauge wheels 54 contact the surface being traversed the power lift 14 may be operated to elevate the rear ends of the arms 60 so as to exert a lifting power on the rods 56 which in turn will elevate the outer ends of the arms 42 so as to move the gauge wheels 54 and the choppers 46 orbicularly about the axes of the shafts 34 and lift them clear of the ground. The device may be readily attached or detached to the rear end of a tractor by disengaging the arms 60 from the crank arms 15 of the power lift 14, loosening the set screw 28 and removing the bolts 16 and it will thus be seen that a tractor attachment is provided which may be easily and quickly attached or detached to a tractor according to the desire of the user.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A cotton chopping attachment for a farm tractor of the type having a power lift and a power take-off, said attachment comprising a pair of arms carried by the farm tractor to move about spaced parallel axes in vertical arcs which lie behind said tractor and perpendicular to the line of advance thereof, a rotary chopper mounted on each arm to rotate in a circular path which lies parallel to the arc through which its respective arm moves, means establishing driving connection between the power take-off of the tractor and the rotary choppers, and a gauge wheel adjustably carried by each arm directly in the line of advance of its respective rotary chopper to regulate the depth to which its respective chopper operates and to cause its respective chopper to follow closely the contour of the surface over which it operates.

2. A cotton chopping attachment for a farm tractor of the type having a power lift and a power take-off, said attachment comprising a pair of arms carried by the farm tractor to move about spaced parallel axes in vertical arcs which lie behind said tractor and perpendicular to the line of advance thereof, a rotary chopper mounted on each arm to rotate in a circular path which lies parallel to the arc through which its respective arm moves, means establishing driving connection between the power take-off of the tractor and the rotary choppers, and a gauge wheel adjustably carried by each arm in advance of its respective rotary chopper to regulate the depth to which its respective chopper operates and to cause its respective chopper to follow closely the contour of the surface over which it operates, coupling means connected to each arm and to the power lift of the tractor for simultaneously lifting both arms upon upward movement of the power lift and elevating the rotary choppers and gauge wheels clear of the ground and yielding means carried by each coupling means to exert yielding pressure on its respective arm when the power lift is lowered.

3. A cotton chopper attachment for a farm tractor of the type having a power lift and a power take-off, said attachment comprising a horizontal frame detachably coupled to the rear axle housing of the farm tractor, said frame extending rearwardly from the tractor, laterally spaced groups of aligned bearings carried by the frame, said bearings lying below said frame, shafts in said bearing lying along spaced horizontal axes which lie parallel to the longitudinal axis of the tractor, arms carried by said shafts and extending radially therefrom toward opposite sides of the tractor, a rotary chopper carried by the end of each arm remote from the shaft, means establishing driving connection between the power take-off of the tractor and the rotary choppers, a bracket mounted on each arm intermediate the ends thereof, a gauge wheel adjustably carried by each bracket for regulating the depth of cut made by the chopper carried by its respective arm, means coupled to each arm and to the power lift for elevating the choppers when the power lift is elevated and yielding means carried by each coupling means for yieldingly urging its respective arm, gauge wheel and chopper into contact with the ground when the power lift is lowered.

ROY NEEL.

REFERENCES CITED

The following references are of record in the file of this patent:

UNITED STATES PATENTS

| Number | Name | Date |
|---|---|---|
| 888,327 | Harris | May 19, 1908 |
| 1,111,655 | Jones | Sept. 22, 1914 |
| 1,387,344 | Boland | Aug. 9, 1921 |
| 1,828,615 | Pearce | Oct. 20, 1931 |
| 2,223,035 | Haas et al. | Nov. 26, 1940 |
| 2,340,657 | Goertzen | Feb. 1, 1944 |
| 2,382,689 | Yates et al. | Aug. 14, 1945 |

FOREIGN PATENTS

| Number | Country | Date |
|---|---|---|
| 13,649 | Denmark | Sept. 5, 1910 |
| 471,154 | France | July 2, 1914 |
| 718,361 | France | Nov. 4, 1931 |